United States Patent [19]
Ajima

[11] Patent Number: 5,845,226
[45] Date of Patent: Dec. 1, 1998

[54] NAVIGATION SYSTEM FOR LEADING TO A DESTINATION AND RECORDING MEDIUM USED FOR THE NAVIGATION SYSTEM

[75] Inventor: Takumi Ajima, Zama, Japan

[73] Assignee: Matsushita Electric Industrial Co., Ltd., Osaka, Japan

[21] Appl. No.: 648,794

[22] Filed: May 16, 1996

[30] Foreign Application Priority Data

May 24, 1995 [JP] Japan ..................................... 7-124741

[51] Int. Cl.⁶ ......................... G08G 1/0969; G01C 21/00
[52] U.S. Cl. ......................... 701/208; 701/211; 340/995
[58] Field of Search .................................... 701/201, 208, 701/209, 211; 340/995; 341/51, 79; 395/101; 707/101

[56] References Cited

U.S. PATENT DOCUMENTS

| | | | |
|---|---|---|---|
| 4,484,192 | 11/1984 | Seitz et al. ............................. | 340/995 |
| 4,890,104 | 12/1989 | Takanabe et al. ...................... | 701/208 |
| 4,891,760 | 1/1990 | Kashiwazaki et al. .................. | 364/443 |
| 5,140,532 | 8/1992 | Beckwith, Jr. et al. ................ | 395/101 |
| 5,274,560 | 12/1993 | LaRue ..................................... | 364/444 |
| 5,343,399 | 8/1994 | Yokoyama et al. ..................... | 701/211 |
| 5,365,449 | 11/1994 | Kashiwazaki ........................... | 701/208 |
| 5,374,933 | 12/1994 | Kao ......................................... | 701/208 |
| 5,467,087 | 11/1995 | Chu .......................................... | 341/51 |
| 5,477,517 | 12/1995 | Gehringer et al. ...................... | 369/50 |
| 5,481,701 | 1/1996 | Chambers, IV ......................... | 395/600 |
| 5,537,324 | 7/1996 | Nimura et al. .......................... | 701/208 |

FOREIGN PATENT DOCUMENTS 3-140816  6/1991  Japan .

*Primary Examiner*—Michael Zanelli
*Attorney, Agent, or Firm*—Lowe Hauptman Gopstein Gilman & Berner

[57] ABSTRACT

Electronic information such as pieces of map information, pieces of index information, pieces of route searching information, pieces of local facility information, pieces of audio information, pieces of dynamic image information and pieces of static image information are recorded in a CD-ROM. A part of electronic information are compressed, and any pieces of information in the remaining part of electronic information is not compressed. When an operator input a current position, a pieces of particular electronic information corresponding to a peripheral area of the current position is read from the CD-ROM to a navigation apparatus, it is judged by a compression mode judging unit whether or not the particular electronic information is compressed. In cases where the particular electronic information is compressed, the particular electronic information is expanded in an expanding unit, and a map image of the peripheral area is prepared in an navigation control unit and is displayed on a display. Therefore, because a part of electronic information are compressed, a large volume of electronic information can be recorded in the CD-ROM, and a navigating operation can be performed at various functions and high performance in a navigation system.

17 Claims, 4 Drawing Sheets

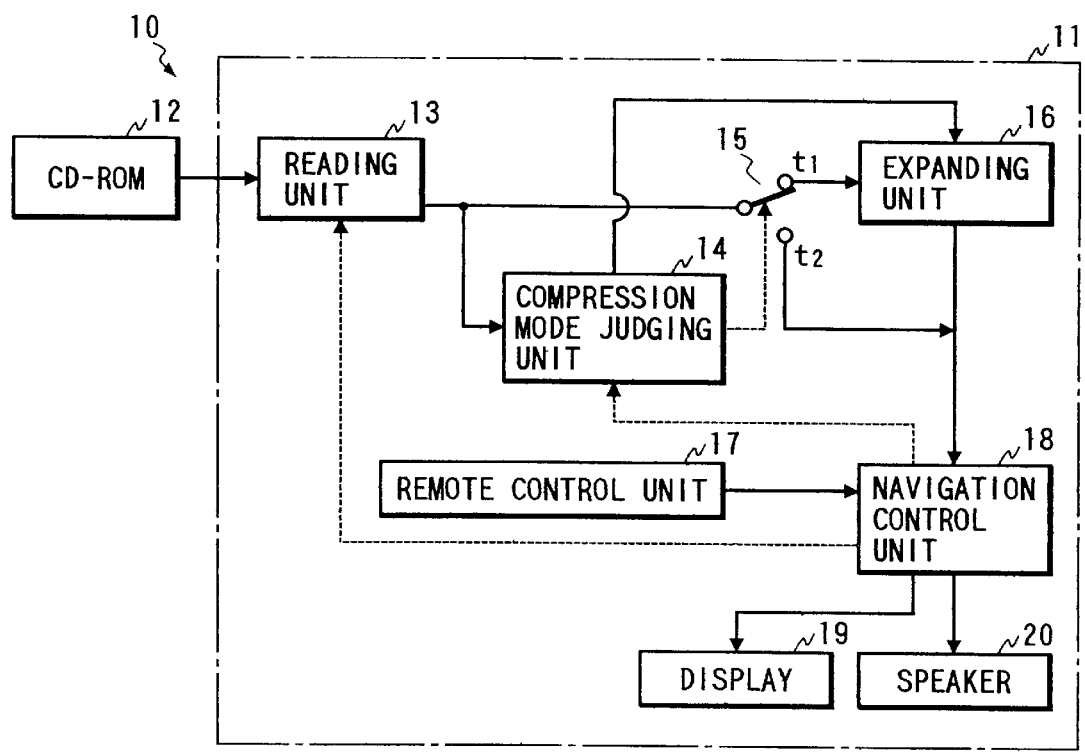
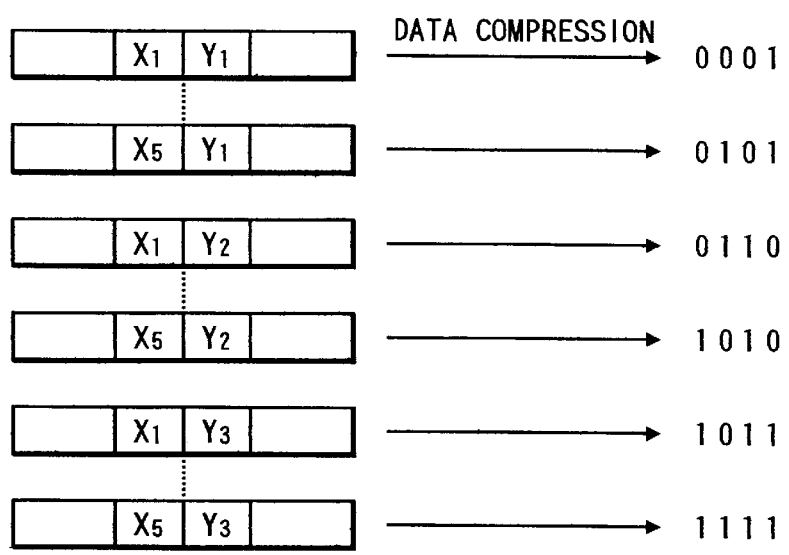

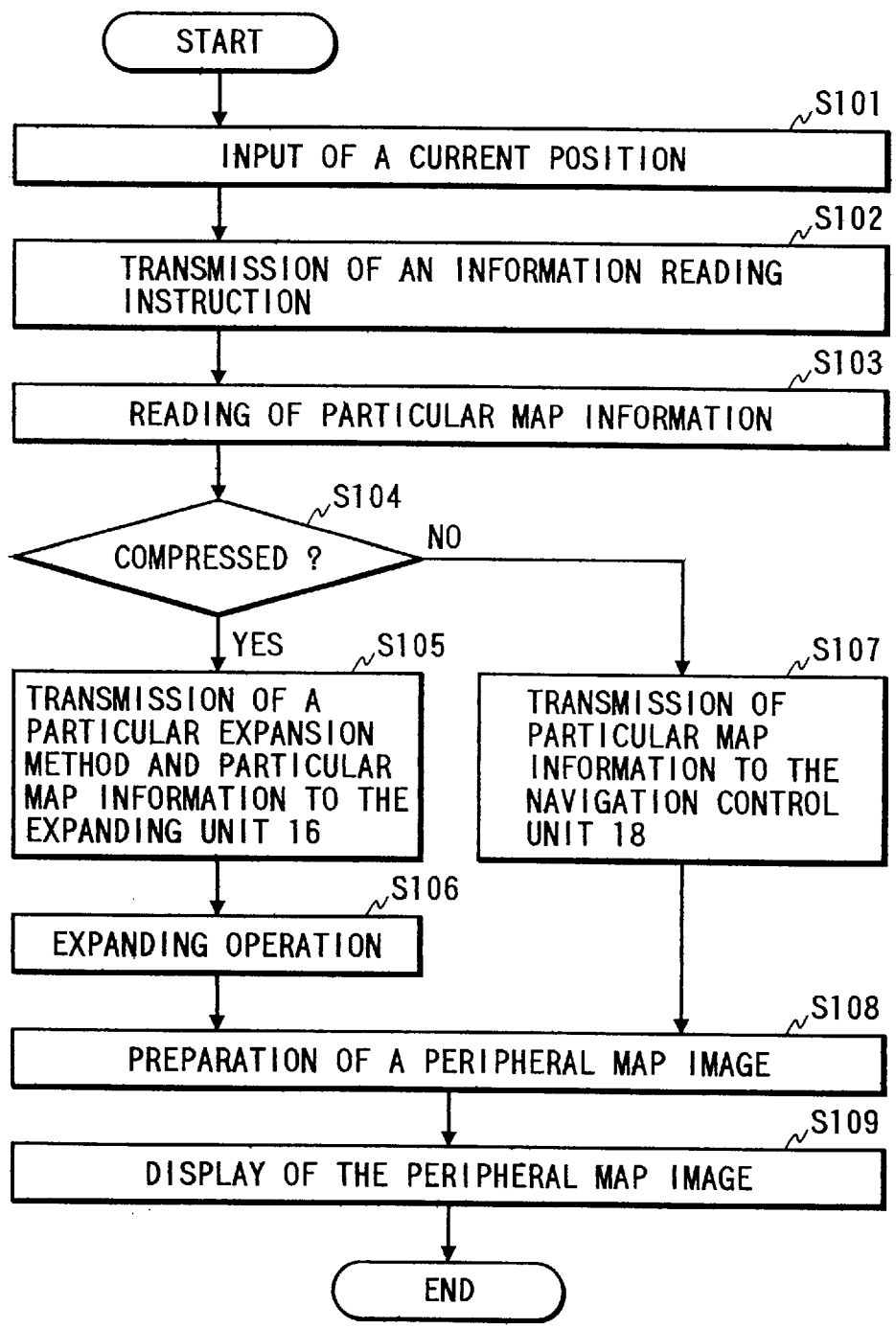

NAVIGATION SYSTEM FOR LEADING TO A DESTINATION AND RECORDING MEDIUM USED FOR THE NAVIGATION SYSTEM

BACKGROUND OF THE INVENTION

1. Field of the Invention

The present invention relates to a navigation system in which a map is displayed on an image plane by using an electronic map, a current position is indicated in the displayed map and a way from the current position to a destination is shown in the displayed map or the way is informed by a voice to lead an operator to the destination. Also, the present invention relates to a recording medium used for the navigation system.

2. Description of the Related Art

In a conventional navigation system, an external memory such as a compact disc read only memory (CD-ROM) is used to store a large volume of map information required for the display of a map. A data format for the map information stored in the CD-ROM is standardized in a navigation meeting. However, in cases where the map information is stored according to the standardized data format, because a data area is required to store a volume of information not actually used, a ratio of a volume of the map information to a storage capacity of the external memory is limit ed. In particular, pieces of character data such as place names, names of intersecting points and various types of index retrieving data are stored in an external memory as character codes expressed according to the American National Standard Code for Information Interchange (ASCII). In cases where the character data are stored in an external memory according to the ASCII, it is well known that a ratio of a volume of the character data actually stored in the external memory to a storage capacity of the external memory is considerably lowered. Also, in cases where the character data are stored in an external memory according to an original data format to heighten the volume of the character data stored in the external memory, though a map format and a data format appropriate to a particular navigation system can be used, there is a drawback that the original data format cannot be used widely for various types of navigation systems.

In general, the CD-ROM is adopted as the external memory of the navigation system conventionally used because a memory capacity of the CD-ROM is large and a cost required to store a bit of data is low. For example, pieces of map information for a map of the whole of Japan are stored in a single CD-ROM in cases where the map is prepared for normal use. However, in cases where a volume of the map information is enlarged by adding various functions to a map of the whole of Japan, it is impossible that the map information are stored in a single CD-ROM, and a plurality of CD-ROMs are required. Therefore, in cases where an operator uses a conventional navigation system, it is required to manually or automatically exchange one CD-ROM for another according to his purpose. In this case, because the operator is normally a driver, it is dangerous that the driver manually exchange one CD-ROM for another when he drives a car. Also, in cases where the exchange of the CD-ROM is automatically performed by using an auto-exchanger, a cost of the conventional navigation system is heightened, and it takes comparatively a long time to automatically exchange the CD-ROM. Therefore, it is impossible as a matter of practical use that a plurality of CD-ROM are used for the conventional navigation system. The use of the conventional navigation system for various purposes is limited. Also, in cases where an auto-exchanger is used both as an auto-exchanger for a music cassette system and an auto-exchanger for the conventional navigation system to seemingly reduce a cost of the conventional navigation system, there is another drawback that the operator cannot use the conventional navigation system when the operator uses the music cassette system.

Therefore, even though a navigation system can be use for various purposes by executing application CD programs, in cases where the operator use the navigation system for a navigation purpose, it is required that the navigation system can be operated without exchanging the CD-ROM because the map information for a map of the whole of Japan are stored in a single CD-ROM.

Also, a data compressing technique for a data file is well known in a computer field. In this computer field, a capacity of an external memory can be efficiently used, and a time required for a data transmission through a network can be shortened by using the data compressing technique. In a general data compressing technique, in cases where a plurality of fixed patterns having the same pattern are transmitted in succession, the fixed patterns are replaced with one fixed pattern and the number of fixed patterns. For example, in cases where ten pieces of original information "0" are transmitted in series, the original information are changed to two pieces of compressed information "0" and "10". Therefore, the number of information to be transmitted can be changed from ten to two. This data compressing technique does not depend on any data format and is used widely.

3. Problems to be Solved by the Invention

However, the function and performance of the conventional navigation system have been improved year after year, and a volume of map information required for the conventional navigation system have been enlarged. Therefore, because a data reading-out speed is low in the CD-ROM, there is a drawback that an executing time for displaying a map cannot be shortened.

Also, in cases where a semiconductor memory is used as a storing medium in place of the external memory such as a CD-ROM or a magnetic tape because a data reading-out speed in the semiconductor memory is high, a cost for the storing medium becomes heightened. Therefore, it is required to use the CD-ROM.

Also, even though the map information for a map of the whole of Japan are currently stored in a single CD-ROM, because the volume of map information have been enlarged year by year, it is required to store a large volume of map information in a single external memory such as a CD-ROM.

SUMMARY OF THE INVENTION

An object of the present invention is to provide, with due consideration to the drawbacks of such a conventional navigation system and a conventional recording medium, a recording medium in which a large volume of map information is recorded and a navigation system in which a navigating operation is performed at various functions and high performance by using the recording medium.

The object is achieved by the provision of a navigation system comprising:

a recording medium for recording pieces of electronic information, a part of the electronic information being compressed;

inputting means for inputting a current position or a desired type of information;

information reading means for reading a piece of particular electronic information corresponding to the current position input to the inputting means from the recording medium or reading a piece of particular electronic information corresponding to the desired type of information input to the inputting means from the recording medium;

information expanding means for expanding the particular electronic information read by the information reading means;

control means for controlling the information reading means to read the particular electronic information according to the current position or a desired type of information input to the inputting means, preparing a map image of a peripheral area of the current position according to the particular electronic information expanded by the information expanding means or preparing a piece of desired information according to the particular electronic information expanded by the information expanding means; and displaying means for displaying the map image of the peripheral area prepared by the control means and the current position input to the inputting means or displaying the desired information prepared by the control means.

In the above configuration, pieces of electronic information such as map data, route searching data, index data, local facility data, address data and telephone number data are compressed and recorded in the recording medium. When an operator inputs a current position or a desired type of information by using the inputting means, the control means instructs the information reading means to read a piece of particular electronic information corresponding to the current position or the desired type of information input to the inputting means from the recording medium.

Thereafter, the particular electronic information is expanded by the information expanding means, a map image of a peripheral area of the current position or a piece of desired information is prepared by the control means according to the particular electronic information, and the map image or the desired information is displayed by the displaying means.

Accordingly, even though the electronic information recorded in the recording medium are compressed, because the particular electric information is expanded by the expanding means, the map image or the desired information can be displayed.

Also, because pieces of electronic information compressed are recorded in the recording medium, a large volume of electronic information can be recorded in the recording medium. Therefore, a navigating operation or a desired information searching operation can performed at various functions and high performance by reading various electric information from the recording medium.

The object is also achieved by the provision of a recording medium used for a navigation system in which a current position and a map image of a peripheral area of the current position is displayed and a piece of desired information is displayed, the recording medium recording pieces of electronic information classified into pieces of map data, pieces of route searching data, pieces of index data, pieces of local facility data, pieces of address data and pieces of telephone number data, and a part of the electronic information being compressed.

In the above configuration, because a part of the electronic information is compressed, a large volume of electronic information can be recorded, and a navigating operation or a desired information searching operation can performed in the navigation system at various functions and high performance by reading various electric information from the recording medium.

BRIEF DESCRIPTION OF THE DRAWINGS

The objects, features and advantages of the present invention will be apparent from the following description taken in conjunction with the accompanying drawings, in which:

FIG. 1 is a block diagram of a navigation system composed of a recording medium and a navigation apparatus according to an embodiment of the present invention;

FIG. 2 is a flow chart showing the procedure of a navigating operation performed in the navigating system shown in FIG. 1;

FIG. 3 shows a data compressing method performed to store pieces of compressed data in the recording medium shown in FIG. 1;

DETAIL DESCRIPTION OF THE EMBODIMENT

Figure 4:
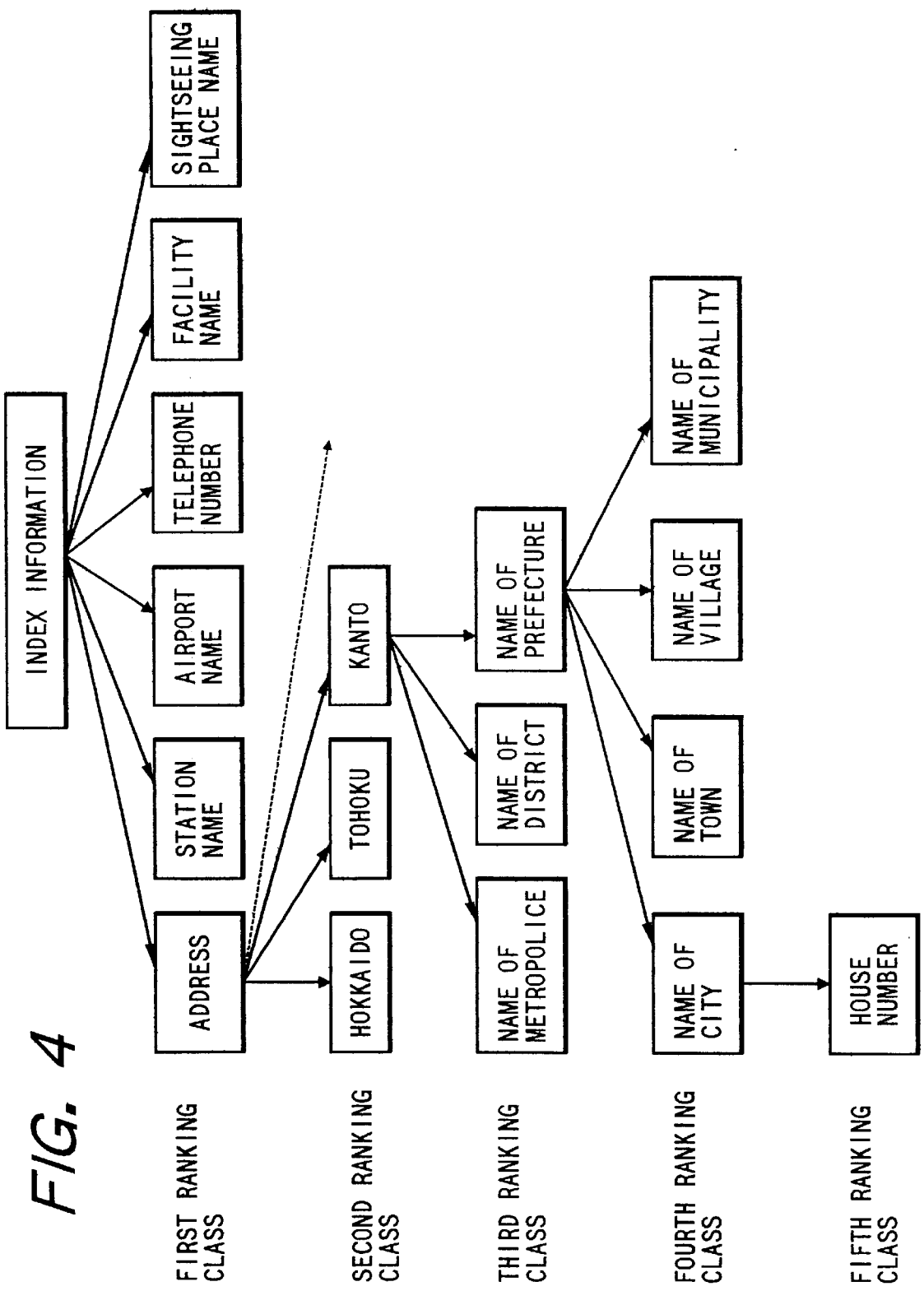
FIG. 4 shows pieces of index information hierarchically arranged in a tree structure.

A preferred embodiment of a navigation system with a recording medium according to the present invention are described with reference to drawings.

FIG. 1 is a block diagram of a navigation system composed of a recording medium and a navigation apparatus according to an embodiment of the present invention.

As shown in FIG. 1, a navigation system 10 comprises a navigation apparatus 11 and a CD-ROM 12 representing an external recording medium for storing electronic information composed of pieces of map information, pieces of index information, pieces of route searching information, pieces of local facility information, pieces of audio information, pieces of dynamic image information and pieces of static image information. The navigation apparatus 11 comprises a reading unit 13 for reading the electronic information from the CD-ROM 12, an compression mode judging unit 14 for judging whether or not the electronic information read by the reading unit 13 is compressed, a selecting switch 15 for selecting either an expansion operation or a non-expansion operation according to the judgement performed by the compression mode judging unit 14, an expansion unit 16 for performing the expansion operation for the electronic information transmitted from the reading unit 13 through the selecting switch 15 in cases where the judgement that the electronic information read by the reading unit 13 is compressed is performed by the compression mode judging unit 14, a remote control unit 17 for inputting a current position or a desired type of information, a navigation control unit 18 for instructing the reading unit 13 to read a piece of particular map information relating to a peripheral area of the current position, preparing a peripheral map image according to the particular map information transmitted from the reading unit 13, instructing the reading unit 13 to read a piece of particular information corresponding to the desired type of information from the CDROM 12, a display 19 for displaying the peripheral map image prepared by the navigation control unit 18 and displaying the particular information read from the CD-ROM 12 under control of the navigation control unit 18, and a speaker 20 for informing an operator of audio information.

In the above configuration, an operation performed in the navigation system 10 is described with reference to FIG. 2.

A part of the electronic information stored in the CD-ROM 12 are compressed according to a particular compressing method, and the remaining part of the electronic information are stored in the CD-ROM 12 with performing any compression. When an operator inputs a current position to the remote control unit 17 (step S101), an information reading instruction for instructing the reading unit 13 to read a piece of particular map information relating to a peripheral area of the current position is prepared in the navigation control unit 18 and is transmitted to the reading unit 13 (step S102). In the reading unit 13, the particular map information is read out from the CD-ROM 12 according to a data format based on CD-ROM standards regardless of whether the particular map information is composed of pieces of compressed data (step S103). Thereafter, it is judged by the compression mode judging unit 14 whether or not the particular map information is composed of pieces of compressed data (step S104).

In cases where the particular map information is composed of pieces of compressed data, the particular compressing method performed for the particular map information is analyzed by the compression mode judging unit 14, and an expansion instruction for instructing the expansion unit 16 to perform a particular expansion method corresponding to the particular compressing method is transmitted to the expansion unit 16 (step S105). Also, a terminal t1 is selected by the selecting switch 15 under the control of the compression mode judging unit 14 to connect the expanding unit 16 with the reading unit 13, and the particular map information is transmitted from the reading unit 13 to the expansion unit 16 (step S105) and is expanded according to the particular expansion method (step S106). In this case, algorithms of various types of expansion methods are stored in a memory of the expanding unit 16, and an algorithm of the particular expansion method is selected according to the expansion instruction. Thereafter, a piece of expanded map information is transmitted to the navigation control unit 18.

In contrast, it is judged by the compression mode judging unit 14 in the step S104 that the particular map information is composed of pieces of non-compressed data, a terminal t2 is selected by the selecting switch 15 under the control of the compression mode judging unit 14, and the particular map information is transmitted from the reading unit 13 to the navigation control unit 18 (step S107).

Thereafter, in the navigation control unit 18, a peripheral map image is prepared according to the particular map information transmitted from the reading unit 13 or the expanded map information transmitted from the expanding unit 16 (step S108), and the peripheral map image and the current position indicated by a cursor is displayed on the display 19 (step S109).

Also, in cases where a desired type of information is input to the remote control unit 17 by the operator, the navigation control unit 18 instructs the reading unit 13 to read a piece of particular information corresponding to the desired type of information, and the particular information are read from the CD-ROM 12. Thereafter, in cases where the particular information is composed of pieces of compressed data, the particular information is expanded in the expanding unit 16 and are displayed on the display 19.

Also, in cases where a dynamic image command (or a static image command) for commanding the navigation apparatus 11 to display a dynamic image (or a static image) is input to the remote control unit 17 by the operator, a piece of dynamic image information (or a piece of static image information) is read out from the CD-ROM 12 to the reading unit 13 under the control of the navigation control unit 18, the dynamic image information (or the static image information) is expanded by the expansion unit 16 in cases where the dynamic image information (or the static image information) is composed of pieces of compressed data, and a dynamic image (or a static image) is displayed on the display 19 in the same manner. In addition, music or speech corresponding to the dynamic image (or a static image) is reproduced by the speaker 20.

Also, in cases where an audio command for commanding the navigation apparatus 11 to inform the operator of audio information is input to the remote control unit 17 by the operator, a piece of audio information is read out from the CD-ROM 12 to the reading unit 13 under the control of the navigation control unit 18, the audio information is expanded by the expansion unit 16 in cases where the audio information is composed of pieces of compressed data, and audio information is informed the operator through the speaker 20.

In cases where it is known in advance that the dynamic image stored in the CD-ROM 12 are obviously compressed according to a moving picture experts group (MPEG), a compressed mode information code for informing the compression mode judging unit 14 that the particular compressing method is the MPEG is transmitted from the navigation control unit 18 to the compression mode judging unit 14, a piece of dynamic image information read out by the reading unit 13 is expanded by the expanding unit 16 according to a particular expanding method corresponding to the MPEG, and the dynamic image is displayed on the display 19.

Accordingly, even though a piece of electronic information stored in the CD-ROM 12 are composed of pieces of compressed data, because it is judged by the compression mode judging unit 14 whether or not the electronic information read out is composed of pieces of compressed data and the electronic information is expanded by the expanding unit 16 in cases where the electronic information is composed of pieces of compressed data, the electronic information can be reliably reproduced by the display 19 or the speaker 20. Therefore, a large volume of electronic information can be stored in the CD-ROM 12 functioning as a recording medium, and a navigating operation can be performed at various functions and high performance in the navigation apparatus 11 by using the CD-ROM 12.

Also, because it is judged by the compression mode judging unit 14 whether or not each piece of electronic information read out is composed of pieces of compressed data, even though pieces of compressed electronic information and pieces of non-compressed electronic information are recorded together in the CD-ROM 12, the electronic information are read from the CD-ROM 12 and are correctly reproduced in the navigation apparatus 11.

Next, a data compressing method for the electronic information stored in the CD-ROM 12 is described.

A fundamental data compressing method depending on a data format in addition to the widely used conventional data compressing method is initially described.

Even though a large volume of data not compressed are arranged in series, in cases where the large volume of data are compressed while considering a value range of each piece of data, a compression rate for the large volume of data can be heightened. For example, as shown in FIG. 3, a series of a byte of data DATA1 and a byte of data DATA2 expressed by hexadecimal notation are considered. In cases where a value range of each data is not limited, any compression cannot be performed for the series of data DATA1 and DATA2. However, in cases where a value range for the data DATA1 is limited to five types of values X1 to X5 and a value range for the data DATA2 is limited to three types of values Y1 to Y3, a value range for the series of data DATAL and DATA2 is limited to fifteen types of values (5*3=15). Therefore, the series of data DATA1 and DATA2 can be indicated by a piece of compressed binary data composed of 4 bits ($2^4$=16) in the CD-ROM 12. Also, because a plurality of pieces of data arranged in series are compressed one by one in the order arranged, in cases where pieces of data of which each value range is limited are gathered in series by changing the arranging order of the data, a compression rate can be moreover heightened. In this case, when an expanding operation is performed in the expanding unit 16 for pieces of compressed data stored in the CD-ROM 12, it is required that pieces of expanded data are inversely rearranged.

Next, three types of data compressing methods changed according to a data format are described.

In a first data compressing method, a large volume of data is divided into a plurality of groups of data, and a data compressing method is performed for each group of data to store each group of compressed data in the CD-ROM 12. In cases where the whole of the large volume of data is compressed without dividing the data, the compression rate can be heightened. However, because it is required to expand and spread a large volume of compressed data obtained from the whole of the large volume of data in a memory, a large capacity of memory is required of the expanding unit 16 of the navigation apparatus 11. Therefore, the large volume of data is divided, and each group of data is compressed and stored in a corresponding memory area of the CD-ROM 12 according to the first data compressing method. For example, the first data compressing method applied for the index information stored in the CD-ROM 12 is described. The index information are used to retrieve a name of a destination such as an address of the destination, a station name, an airport name, a telephone number, a facility name, a name of a sightseeing place or the like and display the destination on the display 19 with a peripheral area of the destination. Therefore, as shown in FIG. 4, the index information are hierarchically arranged in a tree structure composed of a first (or highest) ranking class, a second ranking class and so on. In the first ranking class, the address, the station name, the airport name, the telephone number, the facility name, the name of the sightseeing place and the like are registered. In the second ranking class of the address, area names such as Hokkaido, Tohoku, Kanto or the like are registered. In the third ranking class of the address, names of the metropolis and districts; urban and rural prefectures are registered. In the fourth ranking class of the address, names of cities, towns, and villages; municipalities are registered. In the fifth (or lowest) ranking class of the address, house numbers are registered. That is, data of the station names or data of the airport names are not required when the operator searches the address for a destination indicated by a name of a city, a town or a village; a municipality. Also, data of the Kanto area are not required when the operator searches the Hokkaido area. Therefore, it is not required to expand and spread a large volume of compressed data obtained from the whole of the index information in a memory of the expanding unit 16. In this embodiment, the index information are divided into a group of address information, a group of station name information, a group of airport name information, a group of telephone number information, a group of facility name information, a group of sightseeing point name information and the like classified as the first ranking, and each group of electronic information is compressed and stored in the CD-ROM 12. Therefore, in cases where the operator selects the address displayed on a menu image of the remote control unit 17, pieces address information are read out from the CD-ROM 12 to the reading unit 13 and are expanded and spread in the expanding unit 16. Thereafter, in cases where the operator selects the airport name, pieces of airport name information are expanded and spread in the expanding unit 16 in the same manner.

Accordingly, because the large volume of data is divided into a plurality of groups of data and each group of data is compressed and stored in the CD-ROM 12, though the compression rate for the large volume of data is lowered, a memory capacity of the expanding unit 16 can be reduced, and the navigation apparatus 11 can be manufactured at a low cost.

Also, because the electronic information stored in the CD-ROM 12 are hierarchically arranged in a tree structure, the operator can easily search the electronic information for a piece of desired electronic information. That is, the operator can efficiently retrieve the desired electronic information.

In a second data compressing method, the electronic information except for one or more indexes respectively called a directory in a disk operating system are compressed. The index indicates where a group of electronic information such as a group of prefecture name information, a group of city name information, a group of town name information or a group of house number information is stored in the CD-ROM 12. Therefore, when the operator desires to access to a group of required electronic information, a particular index corresponding to the group of required electronic information is referred by the operator to find out a storing address of the group of required electronic information, and the group of required electronic information is read out from the CD-ROM 12. Because it is required to search the whole of the electronic information stored in the CD-ROM 12 when any index is not prepared, the index is important to find out the group of required electronic information at a high speed. In this embodiment, because the index stored in the CD-ROM 12 is not compressed, the storing address of the group of required electronic information can be transmitted to the navigation control unit 18 without processing the index in the expanding unit 16. Therefore, a navigating operation can be performed at a high speed in the navigation apparatus 11.

To perform the navigating operation at a higher speed, it is preferred that the index be always stored in a memory of the navigation control unit 18. However, in cases where a large number of indexes are required, it is not efficient to store all indexes in the memory of the navigation control unit 18. Therefore, in this case, it is preferred that an index for a group of pieces of electronic information not frequently used be stored in the CD-ROM 12. For example, because the groups of electronic information belonging to the index information shown in FIG. 4 are not frequently used, a plurality of indexes for the index information are stored in the CD-ROM 12.

Also, in cases where a capacity of electronic information in a group is low, it is preferred that the group of electronic information be stored in the CD-ROM 12 without compressing the group of electronic information because a capacity reduction in the compressing operation for the group of electronic information is not sufficient. For example, because the index information are classified in the tree structure, the number of pieces of electronic information in the lowest ranking class is more than 100 while the number of pieces of electronic information in the highest ranking class is almost 10. In this case, even though the area information registered in the highest ranking class are compressed, the reduction of the electronic information capacity is not so much, and it takes a lot of time to expand the compressed area information in the expanding unit 16. Therefore, the area information registered in the highest ranking class are stored in the CD-ROM 12 without compressing the area information. In contrast, in cases where the house number information registered in the lowest ranking class are compressed, a high degree of capacity reduction can be obtained. Therefore, even though it takes time to expand the compressed house number information in the expanding unit 16, because a small memory capacity is required to store the compressed house number information in the CD-ROM 12 and the compressed house number information can be read out from the CD-ROM 12 to the reading unit 13 at a high speed, the compressed house number information are compressed and stored in the CD-ROM 12. In general, a group of electronic information registered in the lower ranking class is compressed and stored in the CD-ROM 12, and a group of electronic information registered in the upper ranking class is stored in the CD-ROM 12 without performing any compressing operation. In this embodiment, to perform the second data compressing method, the CD-ROM 12 has a first memory area for storing a small volume of electronic information belonging to an upper ranking class and a second memory area for storing pieces of compressed electronic information obtained by compressing a large volume of electronic information which belong to a lower ranking class defined.

In a third data compressing method, in cases where a group of non-compressed data is transformed to a group of compressed data and the compressed data are stored in the CD-ROM 12, an index for the non-compressed data is replaced with another index for the compressed data. In detail, in cases where a group of non-compressed data registered in the lower ranking class are compressed to a group of compressed data, because a data size of each data is made small, a head address of each compressed data stored in the CD-ROM 12 differs from that of a corresponding non-compressed data. Therefore, an index for the non-compressed data is not useful for the compressed data. Therefore, an index for the compressed electronic information is prepared. For example, in cases where ten pieces of non-compressed city name information registered in the fourth ranking class of the index information exist as members of a piece of prefecture name information registered in the third ranking class and an information length of each non-compressed city information is 100 bytes, an index for indicating that ten head addresses of the non-compressed city information are placed at 0-th, 100-th, 200-th, 300-th, - - - , and 1900-th addresses is attached to the prefecture information. Therefore, in cases where the operator desires to refer the third city, the index is referred to find out the head address of the third city information, and a piece of electronic information of which the head address is the 200-th address is read out from the CD-ROM 12. However, in cases where the group of the non-compressed city information is compressed at the compression rate of 80%, an information length of each compressed city information becomes 80 bytes. Therefore, an index for indicating that ten head addresses of the compressed city information are placed at 0-th, 80-th, 160-th, 240-th, - - - , and 1520-th addresses is newly prepared and attached to the prefecture information.

Accordingly, even though a group of electronic information is compressed and stored in the CD-ROM 12, because an index for a group of compressed electronic information is attached to a piece of electronic information registered in an upper ranking class, a piece of compressed electronic information desired by the operator can be reliably found out by referring the index.

Next, a compression type indicating method for indicating a data compression method which is performed for pieces of data stored in the CD-ROM 12 is described.

Because electronic information used in the navigation apparatus 11 are read out from a changeable recording medium represented by the CD-ROM 12 and a data compression method applied for pieces of data stored in the CD-ROM 12 is not fixed, it is required to identify a data compression method applied for pieces of data stored in the CD-ROM 12 before the data are read out from the CD-ROM 12 to the navigation apparatus 11. In particular, in cases where a version for electronic information is up, the data compression method is changed. Also, many types of electronic information are produced by many map manufacturers, and the types of electronic information are recorded in various changeable recording mediums according to various data compression methods. Therefore, a piece of identifying information for identifying a data compression method which is applied for pieces of data stored in the CD-ROM 12 is written in the changeable recording medium, and the data are read out from the recording medium after the data compression method is identified by the navigation apparatus 11 by analyzing the identifying information.

Figure 5:
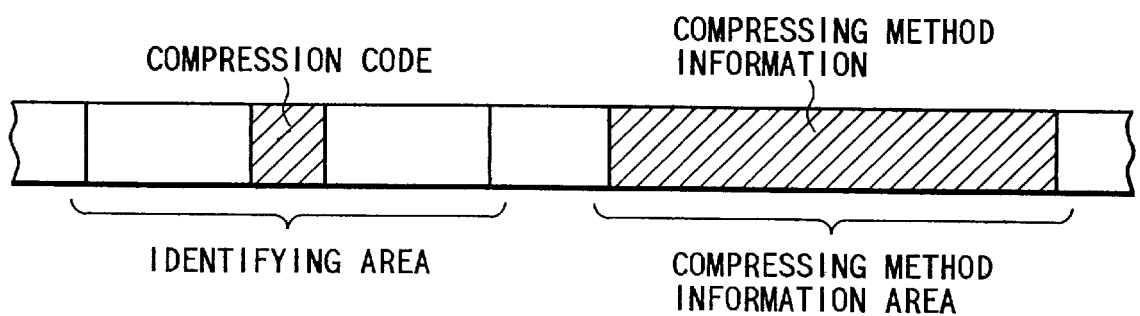
FIG. 5 shows a compression code and compressing method information recorded in the recording medium shown in FIG. 1.

In this embodiment, as shown in FIG. 5, a compression code for judging whether or not pieces of data stored in the CD-ROM 12 are compressed is necessarily stored in an compression identifying area of the CD-ROM 12 as the identifying information. Because an identifying area is necessarily arranged in any map recording medium on the market, the compression code having one bit length is recorded in a part of the identifying area. In cases where the data stored in the CD-ROM 12 are compressed according to a data compressing method, a piece of compressing method information for identifying the data compressing method is additionally arranged in a compressing method information area of the CD-ROM 12 as the identifying information. The identifying information is analyzed in the compression mode judging unit 14. In cases where the compression code indicates that the data stored in the CD-ROM 12 are compressed, a data compressing method is identified according to the compressing method information. For example, a piece of division and compression indicating information for indicating how the electronic information stored in the CD-ROM 12 are divided and compressed, an algorithm name of the data compressing method, a mathematical expression of the data compressing method, an algorithm name of a data expanding method corresponding to the data compressing method, a mathematical expression of the data expanding method, an expansion program expressed by a high-level language and a version number for the expansion method are recorded as the compressing method information in the compressing method information area.

An example of the division and compression indicating information and the version number for the expansion method recorded for the index information as the compressing method information in the compressing method information area of the CD-ROM 12 is described. In the index information formed in the tree structure, the information registered in the lowest ranking class are compressed. Also, three types of data compressing algorithms are considered in this embodiment.

In a first data compressing algorithm, when a plurality of pieces of byte data having the same value are arranged in series, the byte data are replaced with the number of byte data and one piece of byte data. Also, two special codes "00" and "00" are attached to a front side, and a special code "FF" is attached to a rear side. For example, when five bytes of data "00""00""06""5A""FF" are arranged in a series of compressed data, the five bytes of data are expanded to six bytes of data "5A""5A""5A""5A""5A""5A" in the expanding unit 16. In the first data compressing algorithm, when a byte length of a series of non-compressed data is equal to or lower than 5 bytes, the non-compressed data are not compressed because a data length of the non-compressed data is not shortened by the data compression. However, in cases where five bytes of non-compressed data "00""00""$X_1X_2$""$Y_1Y_2$""FF" exist, front two bytes "00""00" are replaced with five bytes of compressed data "00""00""02""00""FF" to avoid that the non-compressed data "00""00""$X_1X_2$""$Y_1Y_2$""FF" are erroneously judged to be pieces of compressed data.

In a second data compressing algorithm, pieces of numeral data are compressed in addition to the compression for the characters according to the first data compressing algorithm. As is well known, a character is expressed by one byte in the ASCII code, and two numerals are expressed by one byte in the ASCII code. Because a particular data pattern "00""00""00""00""FF" does not exist in a series of compressed data obtained according to the first data compressing algorithm, the particular data pattern is arranged on a front side of a piece of compressed data obtained by compressing a pieces of non-compressed data indicating a numeral in the ASCII code, and the number of numerals and a series of compressed data indicating the numerals follow the particular data pattern. For example, numerals are expressed by codes "30" to "39" in the ASCII code, and a series of numerals "98765432145678" are expressed by 14 bytes of non-compressed data "39""38""37""36""35""34""33""32""31""34""35""36""37""38" in the ASCII code, and the numerals are expressed by 13 bytes of compressed data "00""00""00""00""FF""0D""98""76""54""32""14""56""78". The end of the compressed data is identified by one piece of compressed data "0D" indicating the number of numerals. Also, an expanding method is performed by inversely performing the compressing method.

In a third data compressing algorithm, the arrangement of pieces of non-compressed data is changed to heighten a compression rate. For example, data according to the ASCII code is fundamentally expressed by 7 bits, a method in which a feature that 8 characters can be expressed by 7 bytes is used and a method in which the first data compressing algorithm is performed in bit unit are known. In cases where the first data compressing algorithm is performed in bit unit, pieces of data stored in the CD-ROM 12 are read out by the reading unit 13 and are output to the expanding unit 16 in a stream of bits, and the expanding unit 16 is formed in a hardware structure. In general, as a data length of a series of data which can be compressed because a value range of each data is limited becomes longer, the compression rate is heightened. In contrast, in cases where a series of byte data in which a value of each byte data can be set in the whole range from 0 to 255 is arranged, the byte data cannot be compressed. Also, in cases where the arrangement of numerals has no regularity, the data expressing the numerals cannot be compressed. Therefore, in cases where a plurality of streams of ASCII data are dispersed in a stream of binary data, the compression rate can be heightened by gathering the streams of ASCII data. For example, a piece of name data indicating a place name or a piece of positional data indicating a longitude value or a latitude value is registered in the lowest ranking class of the index information for each place point. Because the longitude value or the latitude value is expressed by a piece of binary data composed of a plurality of bytes and a value range for one byte differs from that for another byte, a compression operation for the positional information is not appropriate. In contrast, because the place name is expressed by pieces of ASCII data, a compression operation for the name information is appropriate. Therefore, in cases where a group of a piece of name information and a piece of positional information is indicated by a stream of data, pieces of data corresponding to the name information are gathered and compressed, and the compression rate can be heightened as compared with that obtained by compressing pieces of data corresponding to the name information one by one without gathering the data. In this case, when the data are expressed according to the fixed-point representation system, there is no problem in the compression operation. However, when the data are expressed according to the floating-point representation system, it is required to add a length of one piece of data. In case of an expanding operation, pieces of expanded data obtained in the expanding unit 16 are rearranged, or the expanded data are processed in the navigation control unit 18 while considering that the expanded data are not rearranged.

Because a large volume of information is required to indicate how the arrangement of pieces of non-compressed data is changed before the non-compressed data are compressed, one of a plurality of data arrangement changing codes respectively indicating a data arrangement changing method for changing the arrangement of the non-compressed data is stored in the CD-ROM 12, and a plurality of data rearranging methods corresponding to the data arrangement changing methods are stored in advance in a memory of the expanding unit 16. Therefore, when a data arrangement changing code is read to the reading unit 14, a data arrangement changing method indicated by the data arrangement changing code is identified by the compression mode judging unit 14, a data rearranging method corresponding to the data arrangement changing method is selected in the expanding unit 16, and pieces of expanded data obtained from the compressed data read out from the CD-ROM 12 are rearranged according to the selected data rearranging method.

Next, how the division and compression indicating information and the version number for the expansion method are recorded in the CD-ROM 12 is described.

Figure 6:
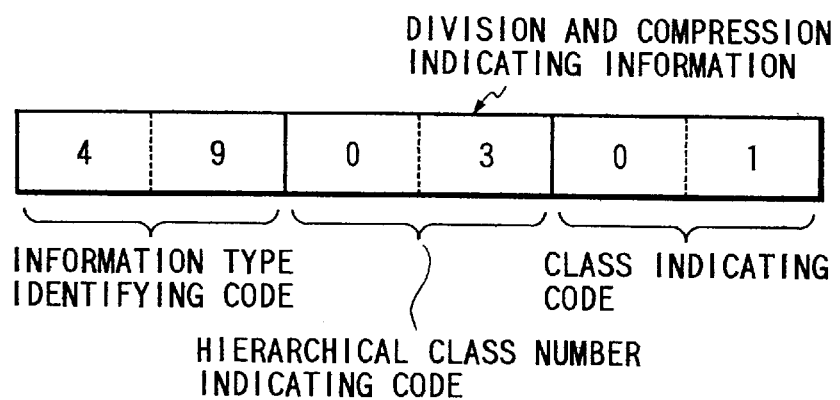
FIG. 6 shows division and compression indicating information recorded in the recording medium shown in FIG. 1.

When the compressed data are recorded in the CD-ROM 12 according to the first data compressing algorithm, the version number for the expansion method is set to "1". When the compressed data are recorded in the CD-ROM 12 according to the second data compressing algorithm, the version number for the expansion method is set to "2". When the compressed data are recorded in the CD-ROM 12 according to the third data compressing algorithm, the version number for the expansion method is set to "3". As shown in FIG. 6, the division and compression indicating information is composed of an information type identifying code for identifying an information type from the group consisting of the map information, the index information, the route searching information, the audio information, the dynamic image information, the static image information and the like, a hierarchical class number indicating code for indicating the number of hierarchical classes in the information type identified by the information type identifying code, a class indicating code for indicating the number of the class in which each piece of information is composed of pieces of compressed data. For example, when the information type identifying code is set to "49" in the ASCII, because the information type identifying code indicates a character "I", the index information is identified. When the hierarchical class number indicating code is set to "03", it is identified that the index information are hierarchically arranged in a tree structure composed of a first (or highest) ranking class, a second ranking class and a third (or lowest) ranking class. When the class indicating code is set to "01", the information registered in the lowest ranking class is composed of pieces of compressed data, and the information registered in the first or second ranking class are not compressed. The division and compression indicating information and the version number for the expansion method read out from the CD-ROM 12 are analyzed in the compression mode judging unit 14.

Next, how it is recognized that the information indicated by the information type identifying code and the hierarchical class number indicating code of the division and compression indicating information are correctly read out from the CD-ROM 12 is described.

In this embodiment, it is judged by the reading unit 13 whether or not the information indicated by the information type identifying code and the hierarchical class number indicating code of the division and compression indicating information are correctly read out from the CD-ROM 12. To perform the judgement in the reading unit 13, not only a physical address of the CD-ROM 12 but also one or more guiding codes indicating the meaning of a piece of reading information are transmitted from the navigation control unit 18 to the compression mode judging unit 14 through the reading unit 13. For example, when pieces of information registered in the third ranking class of the index information are read out from the CD-ROM 12 to the expanding unit 16 through the reading unit 13 because a reading instruction for the information is transmitted from the navigation control unit 18 to the reading unit 13, the guiding codes "49" and "03" are transmitted from the navigation control unit 18 to the compression mode judging unit 14, the division and compression indicating information and the version number for the expansion method are read out from the CD-ROM 12 to the compression mode judging unit 14, and it is judged whether or not the information type identifying code and the hierarchical class number indicating code of the division and compression indicating information agree with the guiding codes.

Therefore, it is recognized by the compression mode judging unit 14 that the information indicated by the information type identifying code and the hierarchical class number indicating code of the division and compression indicating information are correctly read out from the CD-ROM 12, and it is recognized according to the class indicating code that the information are composed of pieces of compressed data. Also, in cases where pieces of compressed data are read out from the CD-ROM 12, the terminal t2 is selected by the selecting switch 15 under the control of the compression mode judging unit 14, the version number for the expansion method is analyzed by the compression mode judging unit 14, and a type of the data compressing method is informed the expanding unit 16 by transmitting the version number for the expansion method to the expanding unit 18.

Accordingly, an expanding operation for the compressed data can be reliably performed.

Also, even though pieces of compressed (or non-compressed) data previously stored in the CD-ROM 12 are changed to pieces of non-compressed (or compressed) data and the non-compressed (or compressed) data are currently stored in the CD-ROM 12, because the division and compression indicating information recorded in the CD-ROM 12 is altered, the compressed data or the non-compressed data read from the CD-ROM 12 can be reliably processed in the navigation apparatus 11.

Also, even though a data compressing method for the compressed data previously stored in the CD-ROM 12 are changed to another data compressing method, because the version number for the expansion method stored in the CD-ROM 12 is altered, the compressed data read from the CD-ROM 12 can be reliably processed in the navigation apparatus 11.

In this embodiment, the CD-ROM 12 is used as a recording medium. However, it is applicable that an optical disk, a magnetic disk, an IC card, a ROM card or a semiconductor memory having a large memory capacity be used in placed of the CD-ROM 12 as the recording medium.

Having illustrated and described the principles of the present invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A navigation system comprising:

a recording medium for recording pieces of electronic information, a part of the electronic information being compressed;

inputting means for inputting at least one of a current position and a desired type of information;

information reading means for reading a piece of particular electronic information corresponding to said at least one of the current position and the desired type of information input to the inputting means from the recording medium;

information expanding means for expanding the particular electronic information read by the information reading means;

control means for controlling the information reading means to read the particular electronic information according to said at least one of the current position and the desired type of information input to the inputting means, and preparing at least one of a map image of a peripheral area of the current position and a piece of desired information according to the particular electronic information expanded by the information expanding means;

displaying means for displaying at least one of the map image of the peripheral area and the desired information prepared by the control means; and compression judging means for judging whether or not the particular electronic information read by the information reading means is compressed, transmitting the particular electronic information to the expanding means in cases where the particular electronic information is compressed, and transmitting the particular electronic information to the control means without expanding the particular electronic information in the expanding means.

2. A navigation system according to claim 1 in which the recording medium has an compression identifying area for recording a compression code to judge whether or not a group of electronic information recorded in the recording medium is compressed according to an information compressing method and a compressing method information area for recording a piece of compressing method information to identify the information compressing method, the judgement of the compression judging means being performed according to the compression code, and an expanding operation of the information expanding means being performed according to the compressing method information.

3. A navigation system according to claim 1 in which a group of the electronic information recorded in the recording medium is composed of a group of pieces of first data respectively compressed according to a value range of each piece of first data and another group of pieces of non-compressed data.

4. A navigation system, comprising:
a recording medium for recording pieces of electronic information in a hierarchically arranged tree structure, a part of the electronic information being compressed;
inputting means for inputting at least one of a current position and a desired type of information;
information reading means for reading a piece of particular electronic information corresponding to said at least one of the current position and the desired type of information input to the inputting means from the recording medium;
information expanding means for expanding the particular electronic information read by the information reading means;
control means for controlling the information reading means to read the particular electronic information according to said at least one of the current position and the desired type of information input to the inputting means, and preparing at least one of a map image of a peripheral area of the current position and a piece of desired information according to the particular electronic information expanded by the information expanding means; and
displaying means for displaying at least one of the map image of the peripheral area and the desired information prepared by the control means.

5. A navigation system according to claim 4 in which the recording medium has a first memory area for storing a small volume of electronic information belonging to an upper ranking class defined by classifying the electronic information hierarchically recorded and a second memory area for storing pieces of compressed electronic information obtained by compressing a large volume of electronic information which belong to a lower ranking class defined by classifying the electronic information hierarchically recorded.

6. A navigation system, comprising:
a recording medium, having a compressing method information area, for recording pieces of electronic information and recording a piece of compressing method information in the compressing method information area to identify an information compressing method, a part of the electronic information being comnpressed, and the compressing method information being composed of a piece of division and compression indicating information for indicating how the electronic information recorded in the recording medium is divided and compressed, a mathematical expression of the information compressing method, a mathematical expression of an information expanding method corresponding to the information compressing method, an expansion program expressed by a high-level language and a version number for the information expanding method;
inputting means for inputting at least one of a current position and a desired type of information;
information reading means for reading a piece of particular electronic information corresponding to said at least one of the current position and the desired type of information input to the inputting means from the recording medium;
information expanding means for expanding the particular electronic information read by the information reading means, an expanding operation of the information expanding means being performed according to the compressing method information recorded in the compressing method information area of the recording medium;
control means for controlling the information reading means to read the particular electronic information according to said at least one of the current position and the desired type of information input to the inputting means, and preparing at least one of a map image of a peripheral area of the current position and a piece of desired information according to the particular electronic information expanded by the information expanding means; and
displaying means for displaying at least one of the map image of the peripheral area and the desired information prepared by the control means.

7. A navigation system according to claim 6 in which the electronic information recorded in the recording medium is divided into a plurality of groups of electronic information.

8. A navigation system, comprising:
a recording medium for recording pieces of electronic information, a part of each of the pieces of electronic information being compressed according to a value range of the corresponding piece of electronic information;
inputting means for inputting at least one of a current position and a desired type of information;
information reading means for reading a piece of particular electronic information corresponding to said at least one of the current position and the desired type of information input to the inputting means from the recording medium;
information expanding means for expanding the particular electronic information read by the information reading means;
control means for controlling the information reading means to read the particular electronic information according to said at least one of the current position and the desired type of information input to the inputting means, and preparing at least one of a map image of a peripheral area of the current position and a piece of desired information according to the particular electronic information expanded by the information expanding means; and displaying means for displaying at least one of the map image of the peripheral area and the desired information prepared by the control means.

9. A navigation system, comprising:

a recording medium for recording pieces of electronic information, a piece of specific electronic information being expressed by arranging pieces of non-compressed data respectively having a limited value range, the specific electronic information being recorded in the recording medium by changing the non-compressed data to pieces of compressed data according to the limited value range of the corresponding piece of non-compressed data;

inputting means for inputting at least one of a current position and a desired type of information;

information reading means for reading a piece of particular electronic information corresponding to said at least one of the current position and the desired type of information input to the inputting means from the recording medium;

information expanding means for expanding the particular electronic information read by the information reading means;

control means for controlling the information reading means to read the particular electronic information according to said at least one of the current position and the desired type of information input to the inputting means, and preparing at least one of a map image of a peripheral area of the current position and a piece of desired information according to the particular electronic information expanded by the information expanding means; and displaying means for displaying at least one of the map image of the peripheral area and the desired information prepared by the control means.

10. A navigation system, comprising:

a recording medium for recording pieces of electronic information, a piece of specific electronic information being expressed by arranging pieces of first non-compressed data each having an unlimited value range and pieces of second non-compressed data each having a limited value range in an original orders and the specific electronic information being recorded in the recording medium by gathering the second non-compressed data in a group, compressing a group of the second non-compressed data to a group of third compressed data and arranging the group of third compressed data and the first non-compressed data in series;

inputting means for inputting at least one of a current position and a desired type of information;

information reading means for reading a piece of particular electronic information corresponding to said at least one of the current position and the desired type of information input to the inputting means from the recording medium;

information expanding means for expanding the particular electronic information read by the information reading means;

control means for controlling the information reading means to read the particular electronic information according to said at least one of the current position and the desired type of information input to the inputting means, and preparing at least one of a map image of a peripheral area of the current position and a piece of desired information according to the particular electronic information expanded by the information expanding means; and displaying means for displaying at least one of the map image of the peripheral area and the desired information prepared by the control means.

11. A recording medium used for a navigation system in which a current position and a map image of a peripheral area of the current position are displayed and a piece of desired information is displayed, the recording medium comprising:

a first memory area for hierarchically recording pieces of electronic information classified into pieces of map information. pieces of route searching information, pieces of index information, pieces of local facility information, pieces of address information and pieces of telephone number information, a part of the electronic information being compressed;

a second memory area for recording a small volume of electronic information belonging to an upper ranking class defined by classifying the electronic information hierarchically recorded in the first memory area; and a third memory area for recording pieces of compressed electronic information obtained by compressing a large volume of electronic information which belong to a lower ranking class defined by classifying the electronic information hierarchically recorded in the first memory area.

12. A recording medium used for a navigation system in which a current position and a map image of a peripheral area of the current position are displayed and a piece of desired information is displayed, the recording medium comprising:

an electronic information memory area for recording pieces of electronic information classified into pieces of map information, pieces of route searching information, pieces of index information, pieces of local facility information, pieces of address information and pieces of telephone number information, a part of the electronic information being compressed; and a compressing method information area for recording a piece of compressing method information to identify an information compressing method, the compressing method information being composed of a piece of division and compression indicating information for indicating how the electronic information is divided and compressed, a mathematical expression of the information compressing method, a mathematical expression of an information expanding method corresponding to the information compressing method, an expansion program expressed by a high-level language and a version number for the information expanding method, and an expanding operation for a piece of particular electronic information corresponding to the current position being performed according to the compressing method information.

13. A recording medium used for a navigation system in which a current position and a map image of a peripheral area of the current position are displayed and a piece of desired information is displayed, the recording medium comprising:

an electronic information memory area for recording pieces of electronic information classified into pieces of map information, pieces of route searching information, pieces of index information, pieces of local facility information, pieces of address information and pieces of telephone number information, a part of the electronic information being compressed, each piece of the electronic information being compressed according to a value range of the corresponding piece of electronic information.

14. A recording medium used for a navigation system in which a current position and a map image of a peripheral area of the current position are displayed and a piece of desired information is displayed, the recording medium comprising:

an electronic information memory area for recording pieces of electronic information classified into pieces of map information, pieces of route searching information, pieces of index information, pieces of local facility information, pieces of address information and pieces of telephone number information, a part of the electronic information being compressed, a group of the pieces of electronic information being composed of a group of pieces of first data respectively compressed according to a value range of the corresponding piece of first data and another group of pieces of non-compressed data.

15. A recording medium used for a navigation system in which a current position and a map image of a peripheral area of the current position are displayed and a piece of desired information is displayed, the recording medium comprising:

an electronic information memory area for recording pieces of electronic information classified into pieces of map information, pieces of route searching information, pieces of index information, pieces of local facility information, pieces of address information and pieces of telephone number information, a part of the electronic information being compressed, a piece of specific electronic information recorded in the electronic information memory area being expressed by arranging pieces of non-compressed data respectively having a limited value range, and the specific electronic information being recorded by changing the pieces of non-compressed data to pieces of compressed data according to the limited value range of the corresponding piece of non-compressed data.

16. A recording medium used for a navigation system in which a current position and a map image of a peripheral area of the current position are displayed and a piece of desired information is displayed, the recording medium comprising:

an electronic information memory area for recording pieces of electronic information classified into pieces of map information, pieces of route searching information, pieces of index information, pieces of local facility information, pieces of address information and pieces of telephone number information, a part of the electronic information being compressed, a piece of specific electronic information being expressed by arranging pieces of first non-compressed data each having an unlimited value range and pieces of second non-compressed data each having a limited value range in an original order, and the specific electronic information being recorded by gathering the second non-compressed data in a group, compressing a group of the second non-compressed data to a group of third compressed data and arranging the group of third compressed data and the first non-compressed data in series.

17. A navigation system, comprising:

a recording medium for recording pieces of electronic information, a piece of specific electronic information being expressed by arranging pieces of first non-compressed data each having an unlimited value range and pieces of second non-compressed data each having a limited value range in an original order, and the specific electronic information being recorded in the recording medium by gathering the second non-compressed data in a group, compressing a group of the second non-compressed data to a group of third compressed data and arranging the group of third compressed data and the first non-compressed data in series;

inputting means for inputting at least one of a current position and a desired type of information;

information reading means for reading a piece of particular electronic information corresponding to said at least one of the current position and the desired type of information input to the inputting means from the recording medium;

information expanding means for expanding the particular electronic information read by the information reading means;

control means for controlling the information reading means to read the particular electronic information according to said at least one of the current position and the desired type of information input to the inputting means, and preparing at least one of a map image of a peripheral area of the current position and a piece of desired information according to the particular electronic information expanded by the information expanding means; and displaying means for displaying at least one of the map image of the peripheral area and the desired information prepared by the control means.

* * * * *